United States Patent
Kim et al.

(10) Patent No.: US 10,856,139 B2
(45) Date of Patent: Dec. 1, 2020

(54) METHOD FOR REPORTING UE CAPABILITY AND DEVICE SUPPORTING THE SAME

(71) Applicant: LG ELECTRONICS INC., Seoul (KR)

(72) Inventors: Hongsuk Kim, Seoul (KR); Youngdae Lee, Seoul (KR); Sangwon Kim, Seoul (KR); Jaewook Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/622,537

(22) PCT Filed: Jun. 15, 2018

(86) PCT No.: PCT/KR2018/006740
§ 371 (c)(1),
(2) Date: Dec. 13, 2019

(87) PCT Pub. No.: WO2018/230983
PCT Pub. Date: Dec. 20, 2018

(65) Prior Publication Data
US 2020/0213836 A1    Jul. 2, 2020

Related U.S. Application Data

(60) Provisional application No. 62/520,503, filed on Jun. 15, 2017, provisional application No. 62/520,507, filed on Jun. 15, 2017.

(51) Int. Cl.
*H04W 8/24* (2009.01)
*H04W 88/08* (2009.01)
*H04W 88/02* (2009.01)

(52) U.S. Cl.
CPC .............. *H04W 8/24* (2013.01); *H04W 88/02* (2013.01)

(58) Field of Classification Search
CPC ......... H04W 36/0066; H04W 74/0033; H04W 8/24; H04W 8/20; H04W 72/048; H04W 36/005; H04W 74/004; H04W 72/0453; H04W 72/1278; H04W 88/08
USPC ................................ 370/280, 335, 329, 331
See application file for complete search history.

(56) References Cited

U.S. PATENT DOCUMENTS

| | | | |
|---|---|---|---|
| 8,514,807 B2* | 8/2013 | Kim | H04W 36/005 370/331 |
| 9,655,121 B2* | 5/2017 | Kim | H04W 8/24 |
| 10,278,183 B2* | 4/2019 | Kim | H04W 88/08 |
| 10,674,512 B2* | 6/2020 | Kim | H04W 72/0453 |
| 2005/0073977 A1* | 4/2005 | Vanghi | H04W 36/0066 370/335 |

(Continued)

OTHER PUBLICATIONS

Ericsson, "Capability Signalling Structure for NR", R2-1704430, 3GPP TSG-RAN WG2 Meeting #98, Hangzhou, China, May 15-19, 2017, see sections 1-2.

(Continued)

*Primary Examiner* — William D Cumming
(74) *Attorney, Agent, or Firm* — Dentons US LLP

(57) ABSTRACT

A method for reporting UE capability in a wireless communication system which includes receiving capability indexes related to the UE capability from a network; and transmitting at least one of the capability indexes and difference configuration of the UE capability compared to the at least one of the capability indexes to the network.

5 Claims, 11 Drawing Sheets

(56) References Cited

U.S. PATENT DOCUMENTS

| | | | |
|---|---|---|---|
| 2012/0184281 A1 | 7/2012 | Kim et al. | |
| 2015/0327269 A1* | 11/2015 | Kim | H04W 74/004 |
| | | | 370/329 |
| 2016/0113037 A1* | 4/2016 | Mizusawa | H04W 74/0833 |
| | | | 370/280 |
| 2017/0251478 A1* | 8/2017 | Kim | H04W 72/0453 |
| 2018/0262905 A1* | 9/2018 | Dhanapal | H04W 8/24 |
| 2019/0069164 A1* | 2/2019 | Kishiyama | H04W 72/1278 |
| 2019/0253925 A1* | 8/2019 | Gholmieh | H04W 8/24 |
| 2019/0261371 A1* | 8/2019 | Kim | H04W 74/004 |
| 2020/0084694 A1* | 3/2020 | Kim | H04L 41/0806 |
| 2020/0092886 A1* | 3/2020 | Kim | H04W 8/24 |
| 2020/0100236 A1* | 3/2020 | Tenny | G06F 16/22 |

OTHER PUBLICATIONS

Samsung, "Clarification on UE capability and early feature support", R2-1705489, 3GPP TSG-RAN2 Meeting #98, Hangzhou, China, May 15-19, 2017, see pp. 3, 21, 24, 34.

Qualcomm Incorporated et al., "UE capability change without re-attach", S2-173047, 3GPP TSG-SA WG2 Meeting #121, Hangzhou, China, May 15-19, 2017, see pp. 3-4.

Huawei et al., "NR UE capability handling", R2-1705163, 3GPP TSG-RAN WG2 Meeting #98, Hangzhou, China, May 15-19, 2017, see sections 1-2.

* cited by examiner

METHOD FOR REPORTING UE CAPABILITY AND DEVICE SUPPORTING THE SAME

This application is the National Stage filing under 35 U.S.C. 371 of International Application No. PCT/KR2018/006740, filed on Jun. 15, 2018, which claims the benefit of U.S. Provisional Applications No. 62/520,507 filed on Jun. 15, 2017, and No. 62/520,503 filed on Jun. 15, 2017, the contents of which are all hereby incorporated by reference herein in their entirety.

BACKGROUND OF THE INVENTION

Field of the Invention

The present invention relates to a wireless communication system, and more particularly, to a method in which reporting UE capability efficiently, and a device supporting the same.

Related Art

Efforts have been made to develop an improved $5^{th}$-generation (5G) communication system or a pre-5G communication system in order to satisfy a growing demand on radio data traffic after commercialization of a $4^{th}$-generation (4G) communication system. A standardization act for a 5G mobile communication standard work has been formally started in 3GPP, and there is ongoing discussion in a standardization working group under a tentative name of a new radio access (NR).

Meanwhile, an upper layer protocol defines a protocol state to consistently manage an operational state of a user equipment (UE), and indicates a function and procedure of the UE in detail. In the discussion on the NR standardization, an RRC state is discussed such that an RRC_CONNECTED state and an RRC_IDLE state are basically defined, and an RRC_INACTIVE state is additionally introduced.

Meanwhile, the UE capability has become large enough now on LTE, that on cell edges it is causing delays in the Attach procedure and delaying the voice camping triggering IRAT transitions. A way is needed to reducing the size of the UE capabilities reporting.

SUMMARY OF THE INVENTION

According to a prior art, radio resources are wasted in reporting UE capability.

According to one embodiment of the present invention, a method for reporting, by a user equipment (UE), UE capability in a wireless communication system, the method comprising: receiving capability indexes related to the UE capability from a network; and transmitting at least one of the capability indexes and difference configuration of the UE capability compared to the at least one of the capability indexes to the network is provided.

The capability indexes may be transmitted via system information block (SIB).

The capability indexes may be transmitted via a UE capability enquiry message.

The method may further comprise selecting the at least one of the capability indexes which are most matched to the UE capability, upon receiving the capability indexes.

The capability indexes may be configured to indicate each UE model.

The capability indexes may be configured to indicate each band or band combination.

The capability indexes may be configured to indicate at least one of RF parameter, physical parameter and MAC parameter.

According to another embodiment of the present invention, a user equipment (UE) in a wireless communication system, the UE comprising: a tranceiver for transmitting or receiving a radio signal; and a processor coupled to the transceiver, the processor configured to: receive capability indexes related to the UE capability from a network; and transmit at least one of the capability indexes and difference configuration of the UE capability compared to the at least one of the capability indexes to the network is provided.

The capability indexes may be transmitted via system information block (SIB).

The capability indexes may be transmitted via a UE capability enquiry message.

The UE may be further configured to: select the at least one of the capability indexes which are most matched to the UE capability, upon receiving the capability indexes.

The capability indexes may be configured to indicate each UE model.

The capability indexes may be configured to indicate each band or band combination.

The capability indexes may be configured to indicate at least one of RF parameter, physical parameter and MAC parameter.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA)

or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

Figure 1:
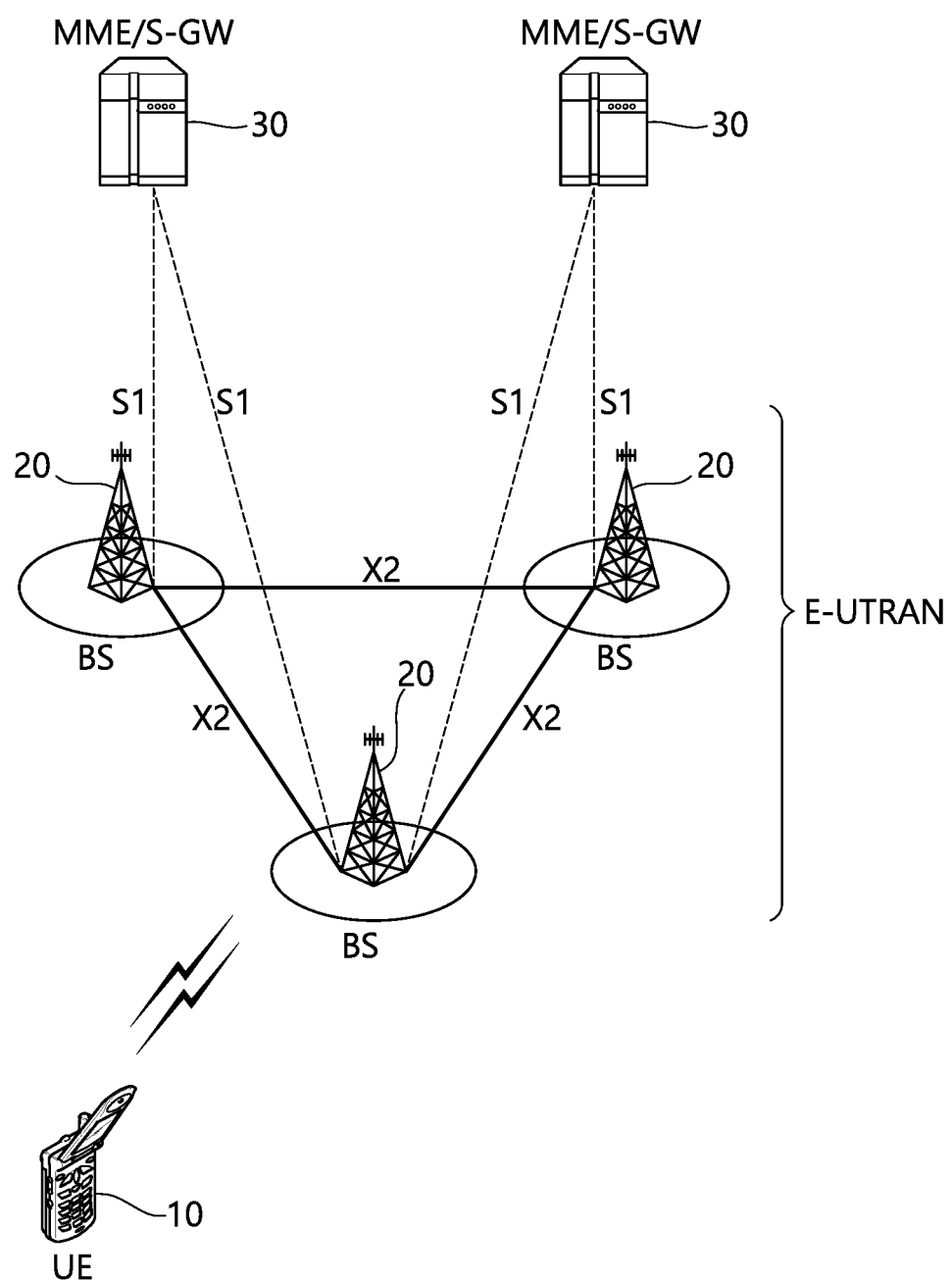
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN may include at least one evolved node-B (eNB) 20, and a plurality of UEs may be present in one cell. An E-UTRAN system is a system evolved from the existing UTRAN system, and may be, for example, a 3GPP LTE/LTE-A system. The E-UTRAN consists of base stations (BSs) (or eNBs) which provide the UE with control plane and user plane protocols, and the BSs are connected through an X2 interface. An X2 user plane (X2-U) interface is defined between the BSs. The X2-U interface provides non-guaranteed delivery of a user plane packet data unit (PDU). An X2 control plane (X2-CP) interface is defined between two neighboring BSs. The X2-CP performs a function of context delivery between BSs, user plane tunnel control between a source BS and a target BS, handover-related message delivery, uplink load management, or the like. The BS is connected to the UE through a radio interface, and is connected to an evolved packet core (EPC) through an S1 interface. An S1 user plane (S1-U) interface is defined between the BS and a serving gateway (S-GW). An S1 control plane (S1-MME) interface is defined between the BS and a mobility management entity (MME). The S1 interface performs an evolved packet system (EPS) bearer service management function, a non-access stratum (NAS) signaling transport function, network sharing, an MME load balancing function, or the like. The S1 interface supports a many-to-many relation between the BS and the MME/S-GW.

The eNB 20 provides the UE with end points of the control plane and the user plane. The eNB 20 is generally a fixed station that communicates with the UE 10 and may be referred to as another terminology, such as a base station (BS), a base transceiver system (BTS), an access point, or the like. One eNB 20 may be arranged in every cell. At least one cell may be present in a coverage of the eNB 20. One cell is configured to have one of bandwidths selected from 1.25, 2.5, 5, 10, and 20 MHz, etc., and provides downlink (DL) or uplink (UL) transmission services to several UEs. In this case, different cells may be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a system architecture evolution (SAE) gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 2:
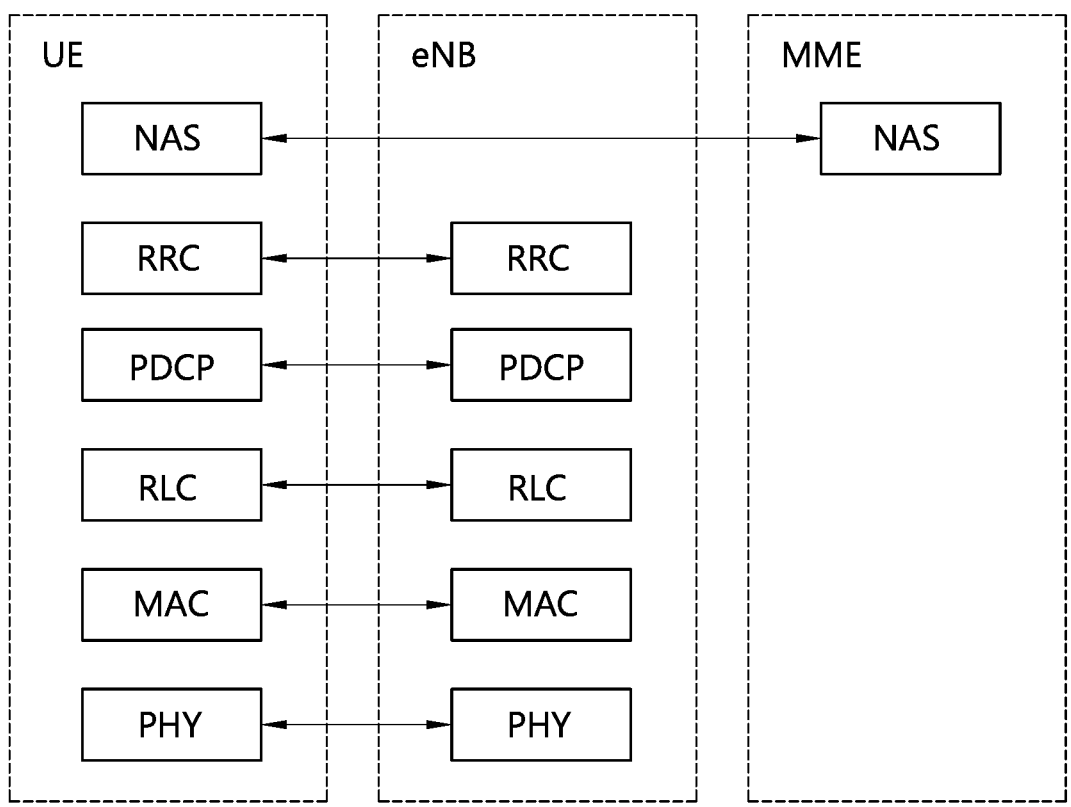
FIG. 2 shows a block diagram of a control plane protocol stack of an LTE system.
Figure 3:
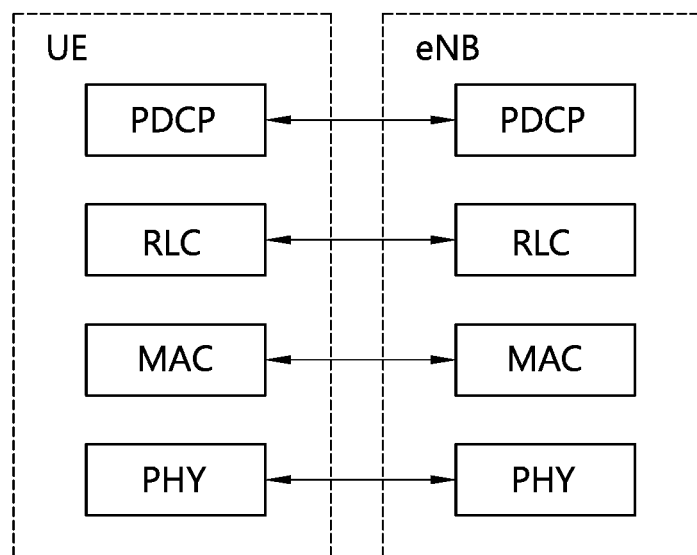
FIG. 3 shows a block diagram of a user plane protocol stack of an LTE system.

FIG. 2 shows a block diagram of a control plane protocol stack of an LTE system, and FIG. 3 shows a block diagram of a user plane protocol stack of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel A physical channel is mapped to the transport channel. Data is transferred between the MAC layer and the PHY layer through the transport channel Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from an upper layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

A non-access stratum (NAS) layer above the RRC layer performs functions, such as session management and mobility management.

Hereinafter, a 5G Network Structure is Described.

Figure 4:
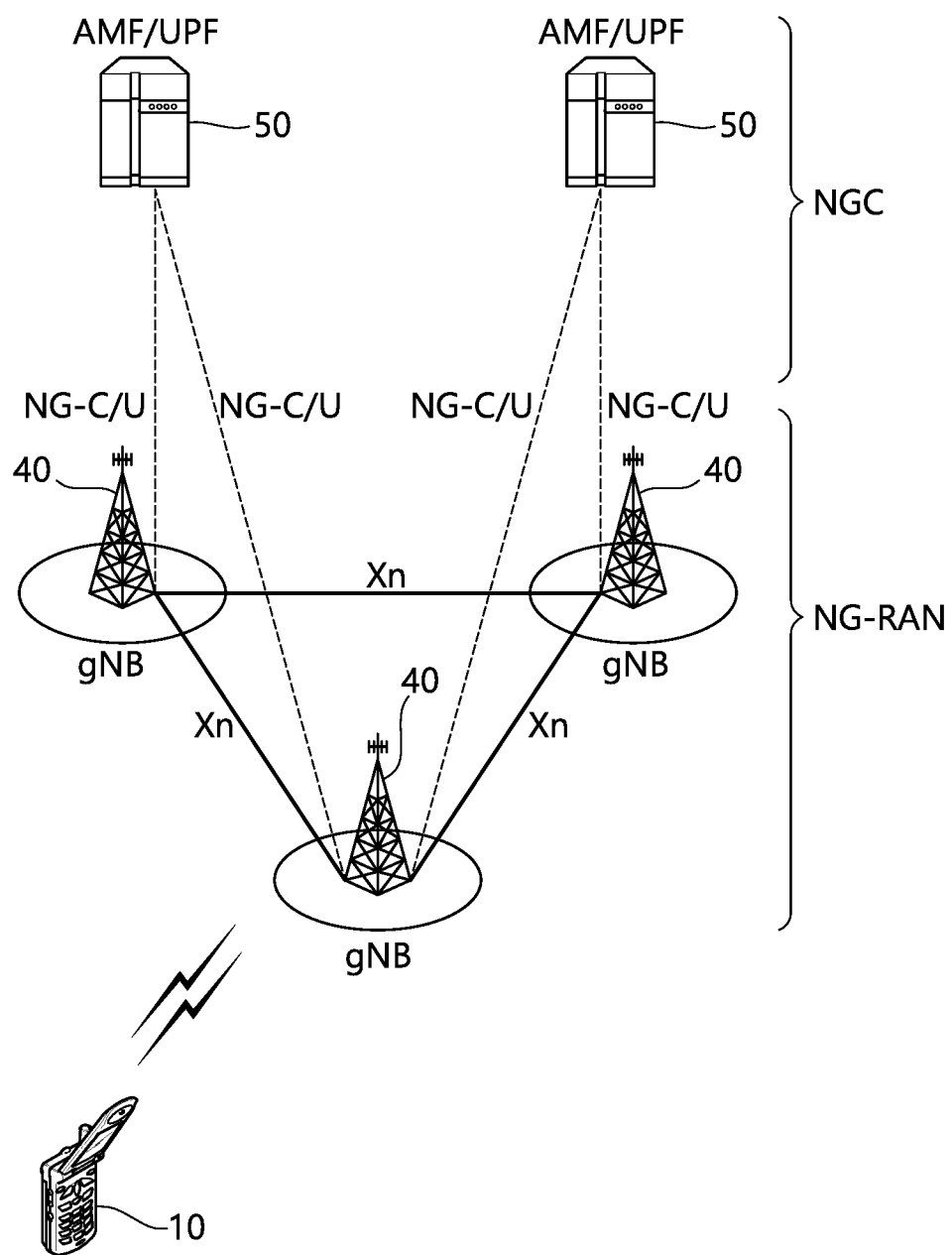
FIG. 4 shows a structure of a 5G system.

FIG. 4 shows a structure of a 5G system.

In case of an evolved packet core (EPC) having a core network structure of the existing evolved packet system (EPS), a function, a reference point, a protocol, or the like is defined for each entity such as a mobility management entity (MME), a serving gateway (S-GW), a packet data network gateway (P-GW), or the like.

On the other hand, in case of a 5G core network (or a NextGen core network), a function, a reference point, a protocol, or the like is defined for each network function (NF). That is, in the 5G core network, the function, the reference point, the protocol, or the like is not defined for each entity.

Referring to FIG. 4, the 5G system structure includes at least one UE 10, a next generation-radio access network (NG-RAN), and a next generation core (NGC).

The NG-RAN may include at least one gNB 40, and a plurality of UEs may be present in one cell. The gNB 40 provides the UE with end points of the control plane and the user plane. The gNB 40 is generally a fixed station that communicates with the UE 10 and may be referred to as another terminology, such as a base station (BS), a base transceiver system (BTS), an access point, or the like. One gNB 40 may be arranged in every cell. At least one cell may be present in a coverage of the gNB 40.

The NGC may include an access and mobility function (AMF) and a session management function (SMF) which are responsible for a function of a control plane. The AMF may be responsible for a mobility management function, and the SMF may be responsible for a session management function. The NGC may include a user plane function (UPF) which is responsible for a function of a user plane.

Interfaces for transmitting user traffic or control traffic may be used. The UE 10 and the gNB 40 may be connected by means of a Uu interface. The gNBs 40 may be interconnected by means of an X2 interface. Neighboring gNBs 40 may have a meshed network structure based on an Xn interface. The gNBs 40 may be connected to an NGC by means of an NG interface. The gNBs 40 may be connected to an AMF by means of an NGC interface, and may be connected to a UPF by means of an NG-U interface. The NG interface supports a many-to-many-relation between the gNB 40 and the AMF/UPF 50.

A gNB host may perform functions such as functions for radio resource management, IP header compression and encryption of user data stream, selection of an AMF at UE attachment when no routing to an AMF can be determined from the information provided by the UE, routing of user plane data towards UPF(s), scheduling and transmission of paging messages (originated from the AMF), scheduling and transmission of system broadcast information (originated from the AMF or O&M), or measurement and measurement reporting configuration for mobility and scheduling.

An access and mobility function (AMF) host may perform primary functions such as NAS signalling termination, NAS signalling security, AS security control, inter CN node signalling for mobility between 3GPP access networks, idle mode UE reachability (including control and execution of paging retransmission), tracking area list management (for UE in idle and active mode), AMF selection for handovers with AMF change, access authentication, or access authorization including check of roaming rights.

A user plane function (UPF) host may perform primary functions such as anchor point for Intra-/inter-RAT mobility (when applicable), external PDU session point of interconnect to data network, packet routing & forwarding, packet inspection and user plane part of policy rule enforcement, traffic usage reporting, uplink classifier to support routing traffic flows to a data network, branching point to support multi-homed PDU session, QoS handling for user plane, e.g. packet filtering, gating, UL/DL rate enforcement, uplink traffic verification (SDF to QoS flow mapping), transport level packet marking in the uplink and downlink, or downlink packet buffering and downlink data notification triggering.

A session management function (SMF) host may perform primary functions such as session management, UE IP address allocation and management, selection and control of UP function, configuring traffic steering at UPF to route traffic to proper destination, controlling part of policy enforcement and QoS, or downlink data notification.

Hereinafter, an RRC_INACTIVE State of a UE is Described.

In the discussion on the NR standardization, an RRC_INACTIVE state (RRC inactive state) has been newly introduced in addition to the existing RRC_CONNETED state and RRC_IDLE state. The RRC_INACTIVE state may be a concept similar to a lightly connected mode which is under discussion in LTE. The RRC_INACTIVE state is a state introduced to efficiently manage a specific UE (for example, mMTC UE). A UE in the RRC_INACTIVE state performs a radio control procedure similarly to a UE in the RRC_IDLE state in order to reduce power consumption. However, the UE in the RRC_INACTIVE state maintains a connection state between the UE and a network similarly to the RRC_CONNECTED state in order to minimize a control procedure required when transitioning to the RRC_CONNECTED state. In the RRC_INACTIVE state, a radio access resource is released, but wired access may be maintained. For example, in the RRC_INACTIVE state, the radio access resource is released, but an NG2 interface between a gNB and am NGC or an S1 interface between an eNB and an EPC may be maintained. In the RRC_INACTIVE state, a core network recognizes that the UE is normally connected to a BS. On the other hand, the BS may not perform connection management for the UE in RRC_INACTIVE state.

Figure 5:
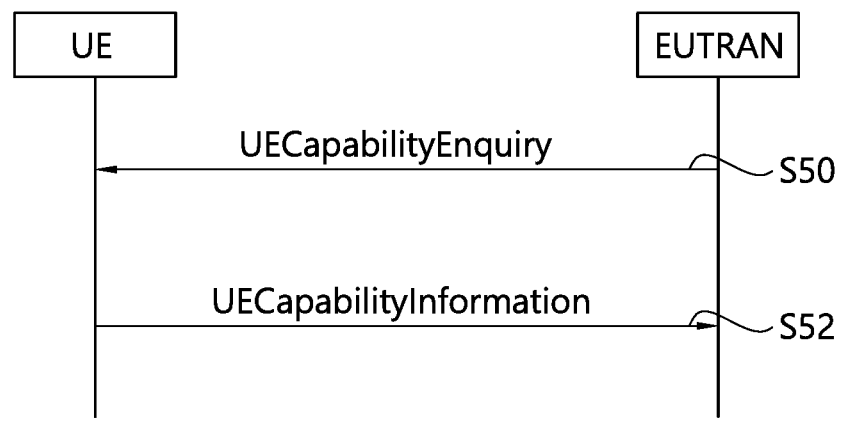
FIG. 5 shows UE capability transfer procedure.

FIG. 5 shows UE capability transfer procedure. The purpose of this procedure is to transfer UE radio access capability information from the UE to E-UTRAN.

If the UE has changed its E-UTRAN radio access capabilities, the UE shall request higher layers to initiate the necessary NAS procedures that would result in the update of UE radio access capabilities using a new RRC connection. Change of the UE's GERAN UE radio capabilities in RRC_IDLE is supported by use of Tracking Area Update. E-UTRAN initiates the procedure to a UE in RRC_CONNECTED when it needs (additional) UE radio access capability information.

In step S50, E-TURAN may send UECapabilityEnquiry message to a UE.

In step S52, the UE may send UECapabilityInformation message to the E-UTRAN, in response to the UECapabilityEnquiry message.

The UE capability has become large enough now on LTE, that on cell edges it is causing delays in the Attach procedure and delaying the voice camping triggering IRAT transitions. A way is needed to reducing the size of the UE capabilities reporting.

Hereinafter, method for reporting UE capability according to an embodiment of present invention is described. In an embodiment of the invention, the method for a terminal (i.e. User Equipment) comprises the following steps:

Step 1: UE may check whether a capability system information exists or the capability system information is valid in the current network. The capability system information may include a list of capability indexes and a list of capability information parameter sets. Each listed capability information parameter set may be associated with a listed capability indexes. The list of capability information parameter sets may represent all types of UE capability parameter sets which are available in the network. When the request or update of UE capability includes capability information which is exactly same with the capability system information, the UE may think that the UE has valid capability system information.

Step 2: If UE doesn't have the stored capability system information which was acquired previously or UE has stored capability system information which is not valid, the UE may try to acquire new capability system information from network. The capability system information could be delivered by broadcast or dedicated way (on-demand) to UE.

Step 3: Upon receiving a request or update of UE capability (update) procedure, if UE find out one or more capability information parameter sets matched with UE's capability among the list of capability information parameter sets, the UE may report the UE capability information at least including the capability index associated with the capability information parameter set matched with UE's capability to the network. In the report, the capability index included in the UE capability information can be included per main parameter level such as band or band combination. if the UE cannot find out any capability information parameter set matched with UE's capability among the list of capability information parameter sets for a certain band or band combination, the UE includes full configuration of capability information parameter set based on UE's capability for the band or the band combination in the message. Else if the UE cannot find out any capability information parameter set matched with UE's capability but if UE can find out a capability information parameter set partially matched with UE's capability among the list of capability information parameter sets for a certain band or band combination, the UE may indicate a capability index and different configuration of a capability information parameter than the capability information parameter set associated with the capability index in the message. The capability index and the different configuration of a capability information parameter can be indicated per band or band combination in the message.

Figure 6:
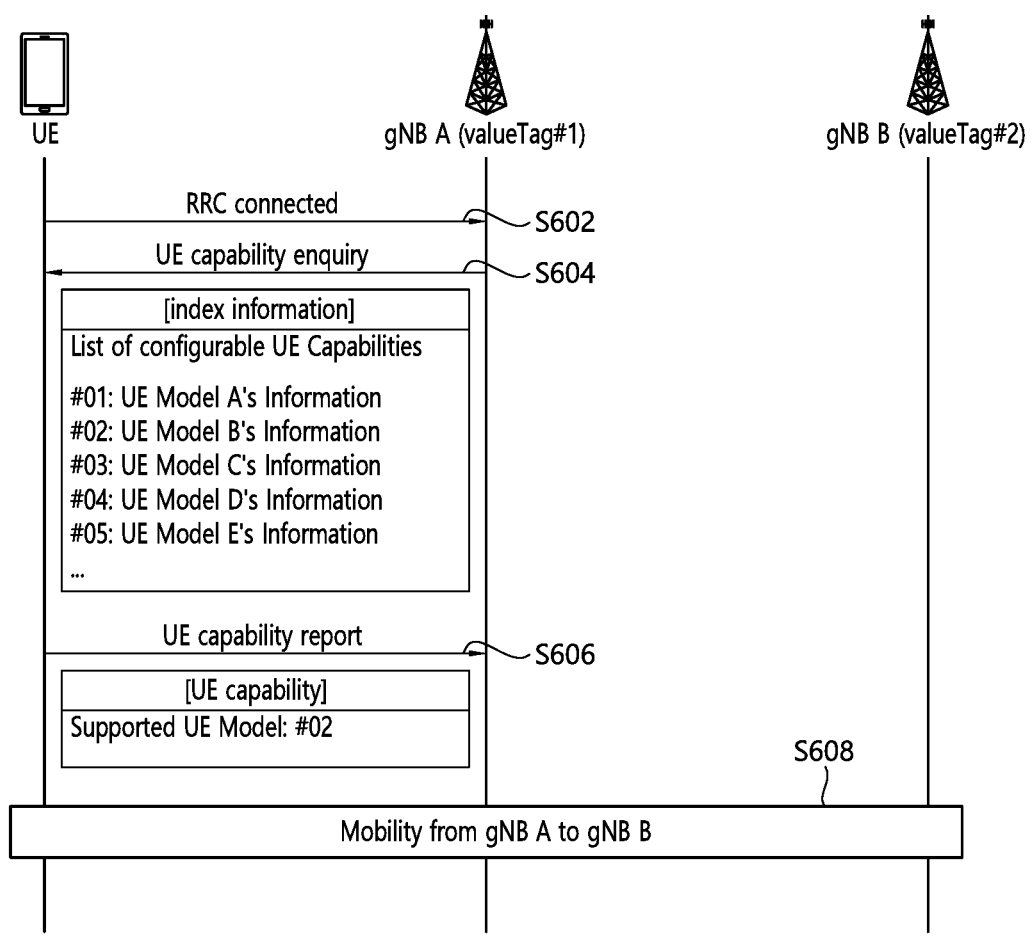
FIG. 6 shows an example of a method for reporting UE capability according to an embodiment of the present invention.

FIG. 6 shows an example of a method for reporting UE capability according to an embodiment of the present invention. In this embodiment, a current UE capability may indicate a UE capability to be reported to a serving cell, and index information may include one or more capability indexes indicating capability information parameters which are consisting of UE capability. According to the embodiment, the current UE capability may be denoted by the capability indexes.

In step S602, UE established RRC Connection in LTE eNB or NR gNB (i.e. serving cell).

In step S604, the serving cell may check the currently stored UE capability information and determine to enquire UE capability update if the current UE capability information is not enough to use or does not exist at all. If the serving cell decides to request the current UE capability, the serving cell may send UECapabilityEnquiry message to UE. In the enquiry message, the serving cell may include a list of index information which is exactly same with the capability system information. The list of index information may include a list of information to configure the current UE capability. The information on capability can be indexed based on some ways. For example, the capability information may indicate elements consisting of the UE capability. The serving cell may index several other UE's whole capability information such as model ID. Because mostly users are using similar type of UEs and anticipating similar type of UE performance so that the actually transferred capability information may be a set except a few minor cases. For example, the capability index list may include index #01 indicating UE model A's information, index #02 indicating UE model B's information, index #03 indicating UE model C's information, index #04 indicating UE model D's information, index #04 indicating UE model D's information and index #05 indicating UE model E's information. In this step, the UE may acquire a SIB for UE capability, if the UE need to acquire the SIB to get a valid version. When the UE need to acquire the SIB for UE capability, the serving cell may provide the capability information via the SIB for UE capability.

In this embodiment, the serving cell may include a list of index information which is exactly same with the capability system information in the enquiry message. If not, the UE may try to acquire the capability SIB (SystemInformationBlock) from the network. In specific, upon receiving the UECapabilityEnquiry message without the configurable index list, the UE may check whether a capability system information is exist or valid. If the UE haven't had the stored capability system information, the UE may try to acquire the capability SIB from the network. If the UE has the stored capability system information but the valueTag for SIB validity is different between current cell and previous cell, the UE may also try to acquire the capability SIB from the network. The UE may acquire the configurable index list via the capability SIB. The capability SIB can be broadcast or be dedicatedly transferred by on-demand type.

In step S606, the UE sends UECapabilityReport to the serving cell including chosen capability index. The UE may choose one or more capability indexes, whose capability information parameters are matched to the current UE capability, among the list of index information of the UECapabilityEnquiry message. The UE may send the chosen capability index to the serving cell. For example, the UE may report its supported UE model by referring capability index #02 to notify that the UE supports UE model B to the serving cell. If there is not any matched capability index to use, the UE may send UECapabilityReport to the serving cell following the legacy procedure.

In step S608, the UE may perform mobility procedure from gNB A to gNB B. The gNB A may be a previously mentioned base station, and the gNB B may be a newly introduced base station. The gNB B doesn't need to update UE capability because the gNB supports same Band list even though they have different SIB.

Figure 7:
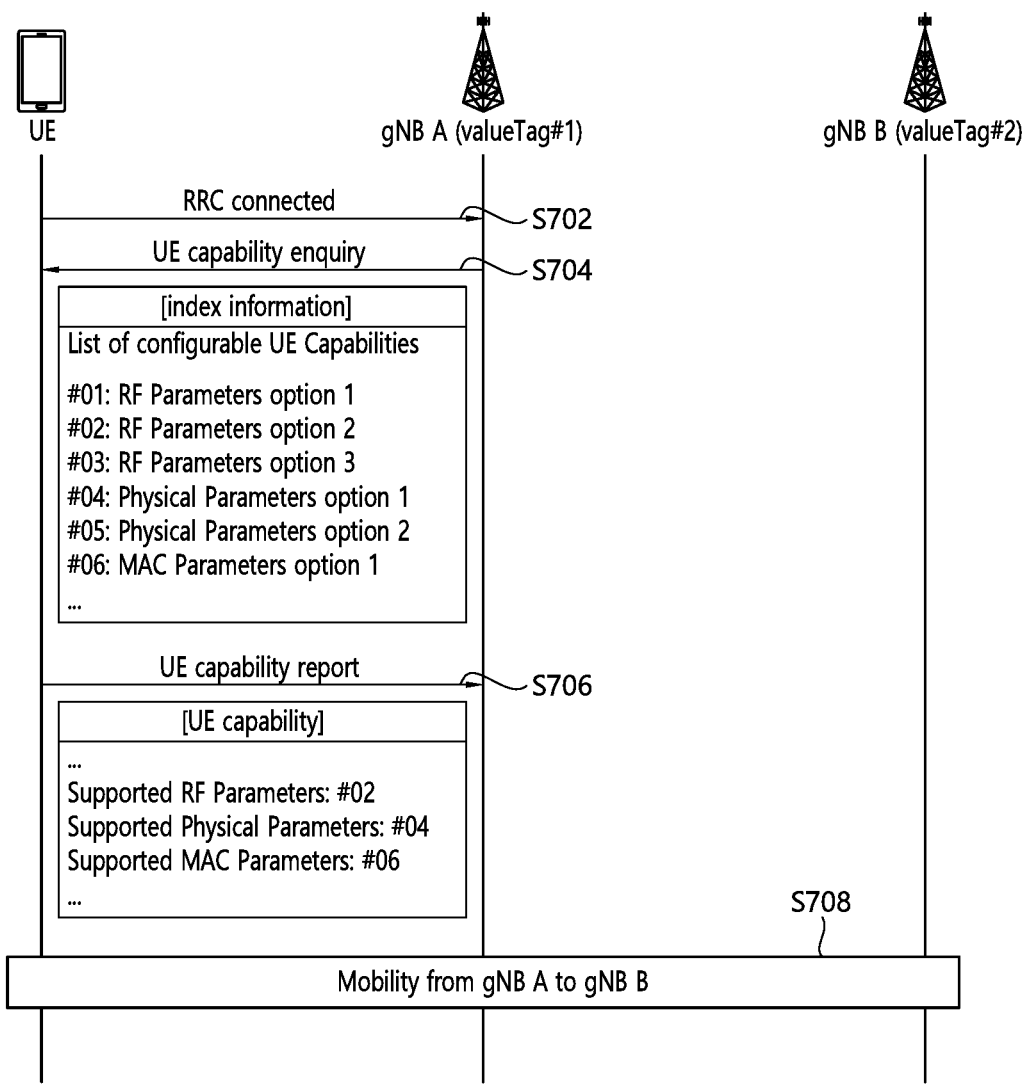
FIG. 7 shows an example of a method for reporting UE capability according to an embodiment of the present invention.

FIG. 7 shows an example of a method for reporting UE capability according to an embodiment of the present invention. In this embodiment, list of index information may include heavy weight capability information parameters which are requiring a lot of detailed information such as RF parameter, physical parameter or MAC parameter.

In step S702, UE established RRC Connection in LTE eNB or NR gNB (i.e. serving cell).

In step S704, the serving cell may check the currently stored UE capability information and determine to enquire UE capability update if the current UE capability information is not enough to use or does not exist at all. If the serving cell decides to request the current UE capability, the serving cell may send UECapabilityEnquiry message to UE. In the enquiry message, the serving cell may include a list of index information which is exactly same with the capability system information. The list of index information may include a list of information to configure the current UE capability. The information on capability can be indexed based on some ways. For example, the serving cell may also index heavy weight capability information parameters which are requiring a lot of detailed information. For example, the capability index list may include index #01 indicating RF parameter option 1, index #02 indicating RF parameters option 2 and index #03 indicating RF parameters option 3. Further, the capability index list may include index #04 indicating physical parameters option 1 and index #05 indicating physical parameters option 2. Further, the capability index list may include index #06 indicating MAC parameters option 1. In this step, the UE may acquire a SIB for UE capability, if the UE need to acquire the SIB to get a valid version. When the UE need to acquire the SIB for UE capability, the serving cell may provide the capability information via the SIB for UE capability.

In this embodiment, the serving cell may include a list of index information which is exactly same with the capability system information in the enquiry message. If not, the UE may try to acquire the capability SIB (SystemInformationBlock) from the network. In specific, upon receiving the UECapabilityEnquiry message without the configurable index list, the UE may check whether a capability system information is exist or valid. If the UE haven't had the stored capability system information, the UE may try to acquire the capability SIB from the network.

In step S706, the UE sends UECapabilityReport to the serving cell including chosen capability index. The UE may choose one or more capability indexes, whose capability information parameters are matched to the current UE capability, among the list of index information of the UECapabilityEnquiry message. The UE may send the chosen capability index to the serving cell. For example, the UE may report its supported RF parameter by referring capability index #02, its supported physical parameter by referring capability index #04 and its supported MAC parameter by referring capability index #06.

In step S708, the UE may perform mobility procedure from gNB A to gNB B. The gNB A may be a previously mentioned base station, and the gNB B may be a newly introduced base station. The gNB B doesn't need to update UE capability because the gNB supports same Band list even though they have different SIB.

Figure 8:
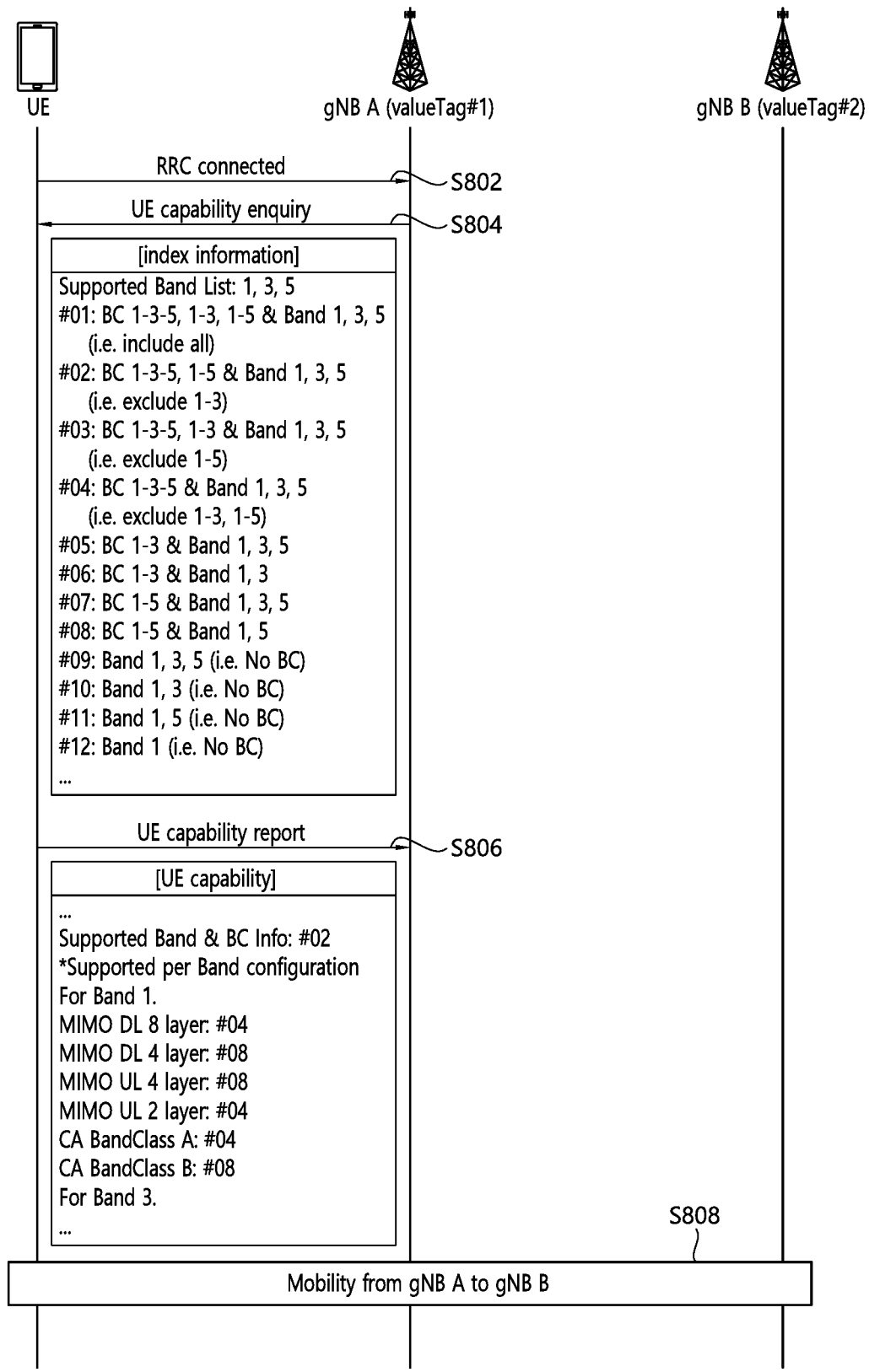
FIG. 8 shows an example of a method for reporting UE capability according to an embodiment of the present invention.

FIG. 8 shows an example of a method for reporting UE capability according to an embodiment of the present invention. In this embodiment, list of index information may include heavy weight capability information parameters which are being duplicated such as band parameters.

In step S802, UE established RRC Connection in LTE eNB or NR gNB (i.e. serving cell).

In step S804, the serving cell may check the currently stored UE capability information and determine to enquire UE capability update if the current UE capability information is not enough to use or does not exist at all. If the serving cell decides to request the current UE capability, the serving cell may send UECapabilityEnquiry message to UE. In the enquiry message, the serving cell may include a list of index information which is exactly same with the capability system information. The list of index information may include a list of information to configure the current UE capability. The information on capability can be indexed based on some ways. For example, the serving cell may also index heavy weight capability information parameters which are being duplicated such as band parameters e.g. supportedBandList or supportedBandCombination. For example, the capability index list may include supported band list (such as 1, 3 and 5) and each index with band combination (such as index #02 indicating band combination 1-3-5, 1-5 and 1, 3, 5). In this step, the UE may acquire a SIB for UE capability, if the UE need to acquire the SIB to get a valid version. When the UE need to acquire the SIB for UE capability, the serving cell may provide the capability information via the SIB for UE capability.

In this embodiment, the serving cell may include a list of index information which is exactly same with the capability system information in the enquiry message. If not, the UE may try to acquire the capability SIB (SystemInformationBlock) from the network. In specific, upon the UE receiving the UECapabilityEnquiry message without the configurable index list, the UE may check whether a capability system information is exist or valid. If the UE haven't had the stored capability system information, the UE may try to acquire the capability SIB from the network.

In step S806, the UE sends UECapabilityReport to the serving cell including chosen capability index. The UE may choose one or more capability indexes, whose capability information parameters are matched to the current UE capability, among the list of index information of the UECapabilityEnquiry message. The UE may send the chosen capability index to the serving cell. For example, the UE may report its supported band and band combination by referring capability index #02, its supported band and band combination by referring capability index #02.

In step S808, the UE may perform mobility procedure from gNB A to gNB B. The gNB A may be a previously mentioned base station, and the gNB B may be a newly introduced base station. The gNB B doesn't need to update UE capability because the gNB supports same Band list even though they have different SIB.

Figure 9:
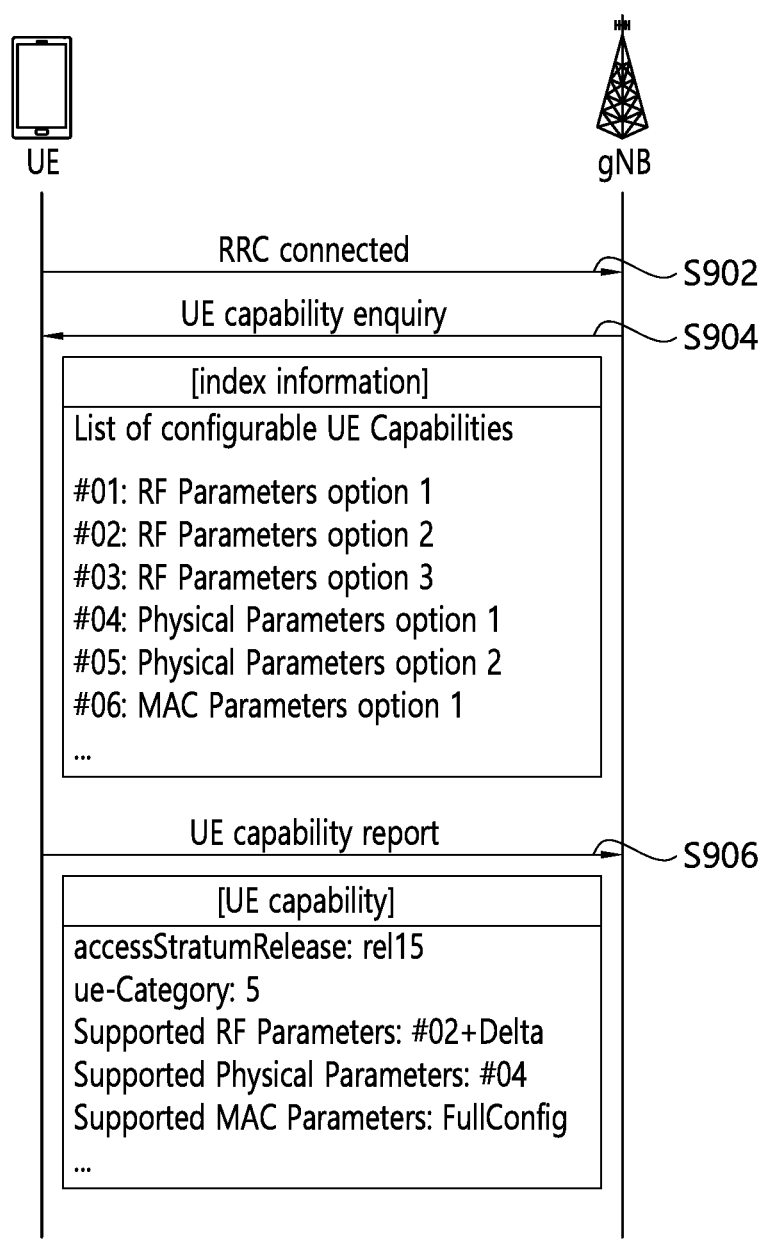
FIG. 9 shows an example of a method for reporting UE capability according to an embodiment of the present invention.

FIG. 9 shows an example of a method for reporting UE capability according to an embodiment of the present invention. In this embodiment, a current UE capability may indicate a UE capability to be reported to a serving cell, and index information may include one or more capability indexes indicating capability information parameters which are consisting of UE capability. According to the embodiment, the current UE capability may be denoted by the capability indexes.

In step S902, UE may establish RRC Connection in LTE eNB or NR gNB (i.e. serving cell).

In step S904, the serving cell may check the currently stored UE capability information and determine to enquire UE capability update if the current UE capability information is not enough to use or does not exist at all. If the serving cell decides to request the current UE capability, the serving cell may send UECapabilityEnquiry message to UE. In the enquiry message, the serving cell may include a list of index information which is exactly same with the capability system information. The list of index information may include a list of information to configure the current UE capability. The serving cell index heavy weight capability information parameters which are requiring a lot of detailed information and being duplicated such as band parameters e.g. bandwidthParameters, supportedBandList or supportedBandCombination. For example, the list of index information may include index #01 indicating RF parameter option 1, index #02 indicating RF parameters option 2 and index #03 indicating RF parameters option 3. Further, the list of index information may include index #04 indicating physical parameters option 1 and index #05 indicating physical parameters option 2. Further, the list of index information may include index #06 indicating MAC parameters option 1.

In this embodiment, the serving cell may include a list of index information which is exactly same with the capability system information in the enquiry message. If not, the UE may try to acquire the capability SIB (SystemInformationBlock) from the network. In specific, upon receiving the UECapabilityEnquiry message without the configurable index list, the UE may check whether a capability system information is exist or valid. If the UE haven't had the stored capability system information, the UE may try to acquire the capability SIB (SystemInformationBlock) from the network. If the UE has the stored capability system information but the valueTag for SIB validity is different between current cell and previous cell, the UE may also try to acquire the capability SIB from the network. The UE may acquire the configurable index list via the capability SIB. The capability SIB can be broadcast or be dedicatedly transferred by on-demand type.

In step S906, the UE may send UECapabilityReport to the serving cell including chosen capability index. The UE may choose one or more capability indexes, whose capability information parameters are matched to the current UE capability, among the list of index information of the UECapabilityEnquiry message. If the UE finds out one or more matched information but the capability indexes are not enough to indicate the whole UE capability, the UE may set the UE capability combined with the matched capability indexes and the rest of capability information as the legacy way. In other words, if there is no capability information parameter exactly matched to the current UE capability, the UE may choose a capability index whose capability information parameter that is most similar to the current UE capability. When the chosen capability index is not perfectly matched to the current UE capability, the UE may report the current UE capability by combining the chosen capability index and rest of capability information. The rest of the capability information may be the difference configurations between the current UE capability and the chosen capability index. If there is not any matched index to use, the UE may send UECapabilityReport to the serving cell following the legacy procedure. For example, UE may report its supported RF parameter by referring index #02, which is partially matched to the UE's capability, combined with delta. Delta may indicate the difference between the current UE capability and chosen capability index #02. In addition, if the each matched capability index only covers the partial set of capability information parameters, the UE may indicate the set of capability information parameters with every detailed capability information parameters which are partially added based on the capability index.

Figure 10:
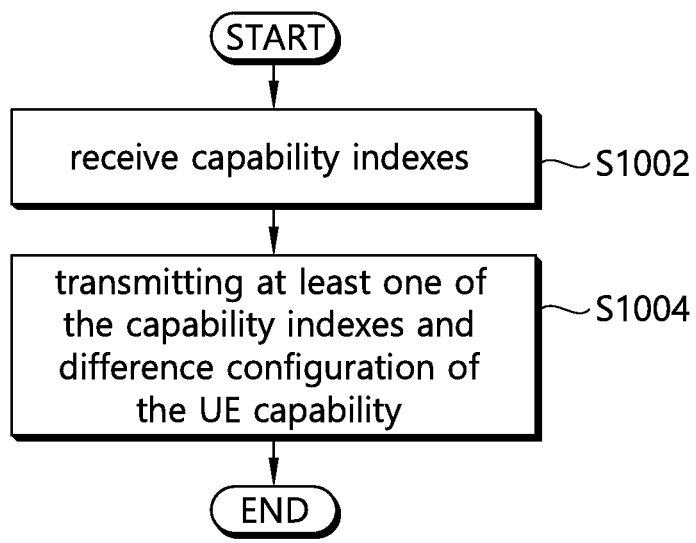
FIG. 10 is a flowchart illustrating a method of reporting UE capability according to an embodiment of the present invention.

FIG. 10 is a flowchart illustrating a method of reporting UE capability according to an embodiment of the present invention.

In step S1002, the UE may receive capability indexes related to the UE capability from a network. The capability indexes may be transmitted via system information block (SIB). The capability indexes may be transmitted via a UE capability enquiry message. The capability indexes may be configured to indicate each UE model. The capability indexes are configured to indicate each band or band combination. The capability indexes are configured to indicate at least one of RF parameter, physical parameter and MAC parameter.

In step S1004, the UE may transmit at least one of the capability indexes and difference configuration of the UE capability compared to the at least one of the capability indexes to the network. The UE may select the at least one of the capability indexes which are most matched to the UE capability, upon receiving the capability indexes.

Figure 11:
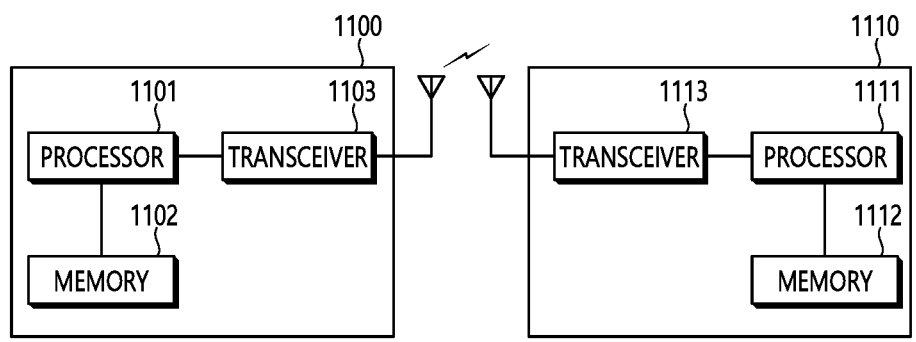
FIG. 11 shows a communication system to implement an embodiment of the present invention.

FIG. 11 shows a communication system to implement an embodiment of the present invention.

A first network node 1100 includes a processor 1101, a memory 1102, and a transceiver 1103. The memory 1102 is coupled to the processor 1101, and stores a variety of information for driving the processor 1101. The transceiver 1103 is coupled to the processor 1101, and transmits and/or receives a radio signal. The processor 1101 implements the proposed functions, procedures, and/or methods. In the aforementioned embodiments, an operation of the first network node may be implemented by the processor 1101.

A second network node 1110 includes a processor 1111, a memory 1112, and a transceiver 1113. The memory 1112 is coupled to the processor 1111, and stores a variety of information for driving the processor 1111. The transceiver 1113 is coupled to the processor 1111, and transmits and/or receives a radio signal. The processor 1111 implements the proposed functions, procedures, and/or methods. In the aforementioned embodiments, an operation of the second network node 1110 may be implemented by the processor 1111.

The processors 1111 may include application-specific integrated circuit (ASIC), other chipset, logic circuit and/or data processing device. The memories may include read-only memory (ROM), random access memory (RAM), flash memory, memory card, storage medium and/or other storage device. The transceivers may include baseband circuitry to process radio frequency signals. When the embodiments are implemented in software, the techniques described herein can be implemented with modules (e.g., procedures, functions, and so on) that perform the functions described herein. The modules can be stored in memories and executed by processors. The memories can be implemented within the processors or external to the processors in which case those can be communicatively coupled to the processors via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the scope of the appended claims.

What is claimed is:

1. A method for reporting, by a user equipment (UE), UE capability in a wireless communication system, the method comprising:

establishing a radio resource control (RRC) connection with a network;

receiving, from the network, a UE capability enquiry message;

checking whether system information related to UE capability is valid or not;

receiving, from the network, the system information related to UE capability based on that the system information related to the UE capability is not valid, system information related to the UE capability includes a list of capability indexes related to the UE capability and a list of capability parameter sets related to the UE capability, wherein the capability parameter sets include UE model, RF parameter, physical parameter, and MAC parameter, and wherein each of the capability indexes is associated with each of the capability parameter sets;

constructing a UE capability reporting message; and transmitting the UE capability reporting message in response to the UE capability enquiry message;

wherein the UE capability reporting message includes only a capability index associated with a capability parameter set fully matched with a current capability parameter set of the UE based on that the current capability parameter set of the UE is included in the list of capability parameter sets, wherein the UE capability reporting message includes a capability index with a capability parameter set partially matched with a current capability parameter set of the UE and a difference configuration between the current capability parameter set of the UE and the capability parameter set based on that a part of the current capability parameter set of the UE is included in the list of capability parameter sets, and wherein the UE capability reporting message includes a current capability parameter set of the UE based on that the current capability parameter set of the UE is not included in the list of capability parameter sets.

2. The method of claim 1, wherein the capability parameter sets further include each band or band combination.

3. The method of claim 1, wherein the UE is in communication with at least one of autonomous vehicles other than the UE.

4. A user equipment (UE) in a wireless communication system, the UE comprising:

a transceiver for transmitting and receiving a radio signal; and a processor coupled to the transceiver, the processor configured to:

establish a radio resource control (RRC) connection with a network;

control the transceiver to receive, from the network, a UE capability enquiry message;

check whether system information related to UE capability is valid or not;

control the transceiver to receive, from the network, the system information based on that the system information related to the UE capability is not valid, wherein the system information related to the UE capability includes a list of capability indexes related to the UE capability and list of capability parameter sets related to the UE capability, wherein the capability parameter sets include UE model, RF parameter, physical parameter, and MAC parameter, and wherein each of the capability indexes is associated with each of the capability parameter sets;

construct a UE capability reporting message; and
control the transceiver to transmit the UE capability reporting message in response to the UE capability enquiry message;
wherein the UE capability reporting message includes only a capability index associated with a capability parameter set fully matched with a current capability parameter set of the UE based on that the current capability parameter set of the UE is included in the list of capability parameter sets,
wherein the UE capability reporting message includes a capability index with a capability parameter set partially matched with a current capability parameter set of the UE and a difference configuration between the current capability parameter set of the UE and the capability parameter set based on that a part of the current capability parameter set of the UE is included in the list of capability parameter sets, and
wherein the UE capability reporting message includes a current capability parameter set of the UE based on that the current capability parameter set of the UE is not included in the list of capability parameter sets.

5. The UE of claim 4, wherein the capability parameter sets further include each band or band combination.

* * * * *